US011276005B2

(12) United States Patent
Borges et al.

(10) Patent No.: US 11,276,005 B2
(45) Date of Patent: Mar. 15, 2022

(54) COGNITIVE ASSESSMENT BASED RECOMMENDATIONS

(71) Applicant: INTERNATIONAL BUSINESS MACHINES CORPORATION, Armonk, NY (US)

(72) Inventors: Gabriel Pereira Borges, Sumare (BR); Fabio Luis Fujii Silveira, Valinhos (BR); Rafael Da Silva Chiarinelli, Nova Odessa (BR); Argemiro Jose de Lima, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 778 days.

(21) Appl. No.: 16/202,843

(22) Filed: Nov. 28, 2018

(65) Prior Publication Data
US 2020/0167670 A1 May 28, 2020

(51) Int. Cl.
*G06F 15/16* (2006.01)
*G06N 5/04* (2006.01)
*G06Q 50/20* (2012.01)
*G06F 16/338* (2019.01)
*H04L 67/50* (2022.01)
*G06Q 50/00* (2012.01)

(52) U.S. Cl.
CPC ............ *G06N 5/04* (2013.01); *G06F 16/338* (2019.01); *G06Q 50/2057* (2013.01); *H04L 67/22* (2013.01); *G06Q 50/01* (2013.01)

(58) Field of Classification Search
CPC .......... H04L 67/22; G06N 5/04; G06F 16/338
USPC ........................................................ 709/200
See application file for complete search history.

(56) References Cited

U.S. PATENT DOCUMENTS

| 11,100,599 B2* | 8/2021 | Rowan ............... G06Q 50/2057 |
| 2003/0009742 A1* | 1/2003 | Bass ......................... G06F 8/20 |
| | | 717/104 |
| 2006/0205564 A1 | 9/2006 | Peterson |
| 2009/0216757 A1* | 8/2009 | Sen ..................... G06F 16/9535 |
| 2010/0082356 A1 | 4/2010 | Verma |

(Continued)

OTHER PUBLICATIONS

Quora; How does LinkedIn's recommendation system work?; https://www.quora.com/How-does-LinkedIns-recommendation-system-work; retrieved from the Internet Nov. 9, 2021; 5 pages.

(Continued)

*Primary Examiner* — Moustafa M Meky
(74) *Attorney, Agent, or Firm* — Schmeiser, Olsen & Watts; Brian M. Restauro

(57) ABSTRACT

An approach is provided for generating cognitive assessment based recommendations. Information about a user is collected. A knowledge domain and sub-domain of the user is determined. Knowledge sources for the knowledge domain and sub-domain are determined. Based on an analysis of the collected information by a personality analysis service using natural language processing, personality traits, needs, and values of the user are determined. Based on an analysis of the knowledge sources and the personality traits, needs, and values of the user by a scenario analysis service, the knowledge sources are ranked. Experts in the knowledge domain and sub-domain are identified by scanning a ranked list of first level contacts and second level contacts of the user. Based on the personality traits, needs, and values, the knowledge sources, and the experts, suggestions for an advancement of a career of the user are generated.

20 Claims, 5 Drawing Sheets

(56) References Cited

U.S. PATENT DOCUMENTS

| | | | |
|---|---|---|---|
| 2011/0276506 A1 | 11/2011 | Schmitt | |
| 2012/0226623 A1* | 9/2012 | Jurney | G06Q 50/01 |
| | | | 705/321 |
| 2014/0322677 A1 | 10/2014 | Segal | |
| 2016/0019505 A1* | 1/2016 | Kamangar | G06Q 10/1053 |
| | | | 381/321 |
| 2016/0042477 A1 | 2/2016 | Gardner | |
| 2016/0379170 A1 | 12/2016 | Pande | |
| 2016/0379516 A1 | 12/2016 | Martinez | |
| 2017/0308811 A1 | 10/2017 | Kumar | |
| 2017/0316319 A1* | 11/2017 | Livingston | G06N 5/04 |
| 2018/0300818 A1 | 10/2018 | Kabdebon | |
| 2019/0130360 A1* | 5/2019 | Wu | G06Q 50/01 |
| 2020/0051450 A1* | 2/2020 | Yeh | G06K 9/00718 |
| 2020/0073893 A1* | 3/2020 | Talgorn | G06F 16/908 |

OTHER PUBLICATIONS

Brown, Steven D. et al; A Social Cognitive Framework for Career Choice Counseling; The Career development quarterly 44(4); Jun. 1996; pp. 354-366.

Heap, Bradford et al.; Combining Career Progression and Profile Matching in a Job Recommender System; Pacific Rim International Conference on Artificial Intelligence; Dec. 1-5, 2014; pp. 396-408.

Malek, Maria et al.; Exhaustive and Guided Algorithms for Recommendation in a Professional Social Network; https://www.researchgate.net/profile/Maria_Malek/publication/266464818_Exhaustive_and_Guided_Algonthms_for_Recommendation_in_a_Professional_Social_Network/links/552ce6ca0cf2e089a3ad0291.pdf; Jul. 31, 2010; 19 pages.

* cited by examiner

300 ↴

| Category | Weight for Quick Goal | Weight for Strategic Goal |
|---|---|---|
| Research trends and articles | 2 | 5 |
| Technology trends | 3 | 5 |
| e-Learning | 5 | 3 |
| In-class learning | 3 | 5 |
| Areas of interest | 2 | 5 |

*FIG. 3*

COGNITIVE ASSESSMENT BASED RECOMMENDATIONS

BACKGROUND

The present invention relates to cognitive assessments, and more particularly to recommendations based on cognitive assessments.

Known systems that provide advice or recommendations based on cognitive assessment utilize hardware and/or software that mimics the functioning of the human brain to improve human decision-making. To mimic the functioning of the human brain, known advice or recommendation systems employ combinations of machine learning algorithms and artificial intelligence, which in some cases, includes natural language processing.

SUMMARY

In one embodiment, the present invention provides a computer-implemented method of generating cognitive assessment based recommendations. The method includes collecting, by one or more processors, individual information associated with a user. The individual information includes writings authored by the user. The method further includes determining, by the one or more processors, a knowledge domain of the user and a knowledge sub-domain of the user which is associated with the knowledge domain. The method further includes determining, by the one or more processors, knowledge sources that supply knowledge in the knowledge domain and the knowledge sub-domain. The method further includes based on an analysis of the individual information by a personality analysis service using natural language processing, determining, by the one or more processors, personality traits, needs, and values of the user. The method further includes based on an analysis of the knowledge sources and the personality traits, needs, and values of the user by a scenario analysis service, ranking, by the one or more processors, the knowledge sources. The method further includes identifying, by the one or more processors, experts in the knowledge domain and sub-domain of the user by scanning a ranked list of first level contacts and second level contacts of the user in one or more professional networking service. The method further includes based on the personality traits, needs, and values of the user, the ranked knowledge sources, and the identified experts, generating, by the one or more processors, ranked suggestions for an advancement of a career of the user, the suggestions including one or more quick goals and one or more strategic goals.

In another embodiment, the present invention provides a computer program product for generating cognitive assessment based recommendations. The computer program product includes a computer readable storage medium. Computer readable program code is stored in the computer readable storage medium. The computer readable program code is executed by a central processing unit (CPU) of a computer system to cause the computer system to perform a method. The method includes the computer system collecting individual information associated with a user. The individual information includes writings authored by the user. The method further includes the computer system determining a knowledge domain of the user and a knowledge sub-domain of the user which is associated with the knowledge domain. The method further includes the computer system determining knowledge sources that supply knowledge in the knowledge domain and the knowledge sub-domain. The method further includes based on an analysis of the individual information by a personality analysis service using natural language processing, the computer system determining personality traits, needs, and values of the user. The method further includes based on an analysis of the knowledge sources and the personality traits, needs, and values of the user by a scenario analysis service, the computer system ranking the knowledge sources. The method further includes the computer system identifying experts in the knowledge domain and sub-domain of the user by scanning a ranked list of first level contacts and second level contacts of the user in one or more professional networking services. The method further includes based on the personality traits, needs, and values of the user, the ranked knowledge sources, and the identified experts, the computer system generating ranked suggestions for an advancement of a career of the user, the suggestions including one or more quick goals and one or more strategic goals.

In another embodiment, the present invention provides a computer system including a central processing unit (CPU); a memory coupled to the CPU; and a computer readable storage medium coupled to the CPU. The computer readable storage medium contains instructions that are executed by the CPU via the memory to implement a method of generating cognitive assessment based recommendations. The method includes the computer system collecting individual information associated with a user. The individual information includes writings authored by the user. The method further includes the computer system determining a knowledge domain of the user and a knowledge sub-domain of the user which is associated with the knowledge domain. The method further includes the computer system determining knowledge sources that supply knowledge in the knowledge domain and the knowledge sub-domain. The method further includes based on an analysis of the individual information by a personality analysis service using natural language processing, the computer system determining personality traits, needs, and values of the user. The method further includes based on an analysis of the knowledge sources and the personality traits, needs, and values of the user by a scenario analysis service, the computer system ranking the knowledge sources. The method further includes the computer system identifying experts in the knowledge domain and sub-domain of the user by scanning a ranked list of first level contacts and second level contacts of the user in one or more professional networking services. The method further includes based on the personality traits, needs, and values of the user, the ranked knowledge sources, and the identified experts, the computer system generating ranked suggestions for an advancement of a career of the user, the suggestions including one or more quick goals and one or more strategic goals.

BRIEF DESCRIPTION OF THE DRAWINGS

FIG. 3 is an example of assigning weights to knowledge source categories in the process of FIGS. 2A-2B, in accordance with embodiments of the present invention.

DETAILED DESCRIPTION

Overview

Figure 1:
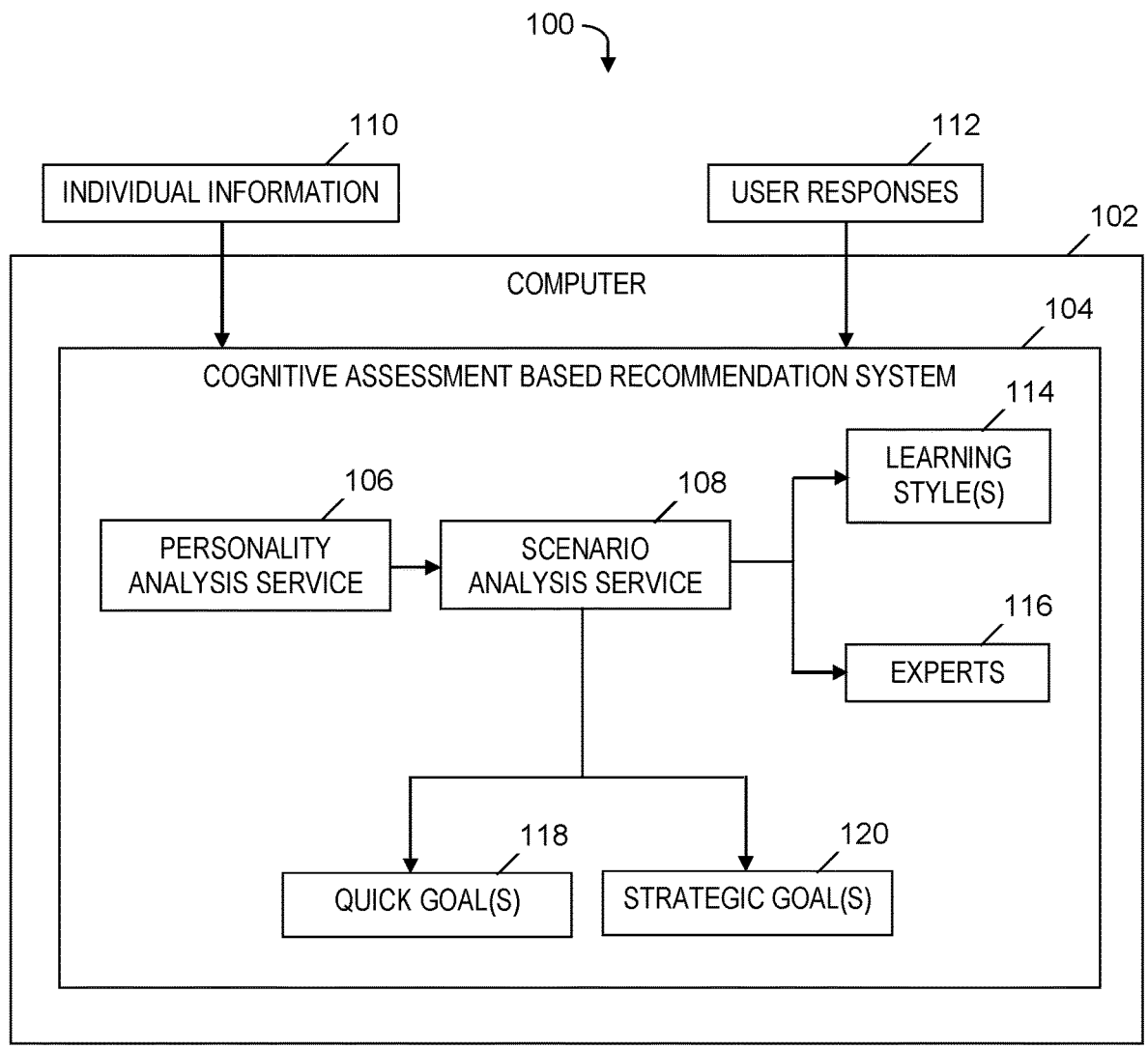
FIG. 1 is a block diagram of a system for generating cognitive assessment based recommendations, in accordance with embodiments of the present invention.

Known career management techniques that match a person to a knowledge source to advance the person's career are incorporated in known professional social network services that utilize keyword matching, skills mapping, and matching to similar companies and areas of interest. Conventional techniques for advancing a career of an employee include using recommendations and career mentoring. Recommendations are prone to fail because it is difficult for the employee to keep track of the capabilities and skills of the employee's friends. By the time the employee's friend recommends the employee for a new position, the focus of the employee's work may have already changed to a new area that is different from the area of the new position. Conventional career coach identification techniques that use pure analytics over large datasets emphasize identifying a large quantity of possible career coaches, even though a large number of the identified career coaches are ineffective because they are not aligned with the employee's goals and personality, are not experts in the employee's area of interest, and/or lack the knowledge to advise the employee about relevant trends in the employee's area of interest. Conventional automated career coaching techniques utilize keyword matching, skills mapping and matching, and similar companies and areas of interest, but fail to adequately mimic the reasoning of a human career coach.

Embodiments of the present invention address the unique career coaching challenges of the conventional techniques by utilizing cognitive assessment to simulate the reasoning and guidance of a human career coach. In one embodiment, parameters such as social network data, personality analysis, professional skills, market trends, and expert reports are considered to match a user with the user's peers in a professional network and make suggestions about the best knowledge sources to advance the user's career (e.g., through behavior and ability development). In one embodiment, cognitive services and algorithms determine an optimal career advancement path which provides quick goals and strategic goals, which connect the user with experts that can assist the user as career coaches and who are aligned with the career goals and areas of interest of the user and which provide knowledge sources for the user to be updated about market trends that affect the career advancement of the user. As used herein, a quick goal is defined as a goal that is accomplished within a first time period that begins at a current time and ends at a configurable amount of time after the current time, and a strategic goal is defined as a goal that is accomplished within a second time period that begins and ends after the completion of the first time period.

In one embodiment, the cognitive services and algorithms help a user to assimilate career issues and skill development according to a social network of professionals by applying behavioral analysis of contacts of the user to maximize networking engagement with the contacts. In one embodiment, a system for cognitive career coaching provides career coaching suggestions and makes better suggestions over time as the system gains knowledge from incoming user responses and personality analysis.

System for Cognitive Assessment Based Recommendations

FIG. 1 is a block diagram of a system 100 for generating cognitive assessment based recommendations, in accordance with embodiments of the present invention. System 100 includes a computer 102 which executes a software-based cognitive assessment based recommendation system 104, which includes a personality analysis service (PAS) 106 and a scenario analysis service (SAS) 108. A user grants access to cognitive assessment based recommendation system 104 to retrieve individual information 110 of the user from the user's social networks, professional networks, blogs, micro blogs, sent emails, and other writings authored by the user. Individual information 110 also includes information specifying courses and training that the user has completed.

Cognitive assessment based recommendation system 104 receives user responses 112, which are answers to questions that are designed to identify the user's knowledge domain and knowledge sub-domain. For example, user responses 112 may indicate that the user's knowledge domain is medicine and the user's knowledge sub-domain is neurology. Cognitive assessment based recommendation system 104 identifies knowledge sources (i.e., data sources) for the knowledge domain and sub-domain of the user, where the knowledge sources are included in categories that are weighted. In one embodiment, the categories of the knowledge sources include (1) areas of interest, (2) research trends and articles, (3) technology trends, (4) e-learning, and (5) in-class learning. In the example in which medicine is the knowledge domain of the user, cognitive assessment based recommendation system 104 identifies headaches, impulsive behavior, and persons with disabilities as the areas of interest of the user and further identifies periodicals, magazines, and specialized websites for the research trends and articles category, websites and events for the technology trends category, massive open online courses (MOOC) for the e-learning category, and courses at universities and user groups for the in-class learning category.

Cognitive assessment based recommendation system 104 receives and/or collects individual information 110 and user responses 112 in response to the user granting permission for the receipt and/or collection of the individual information 110 and user responses 112. In one embodiment, cognitive assessment based recommendation system 104 includes a feature that allows the user to opt-in or opt-out of providing individual information 110 and user responses 112 in their entirety or in accordance with user-specified types of information.

PAS 106 performs a cognitive assessment of text included in or derived from individual information 110 by utilizing natural language processing (NLP) to analyze a spectrum of personality attributes to determine the personality of the user. In one embodiment, PAS 106 utilizes NLP together with one or more psychology models, such as the Big Five Personality Trait model, to determine personality traits, needs, and values of the user.

PAS 106 utilizes NLP to determine the personality traits of the first level contacts and second level contacts of the user from the user's professional network. PAS 106 filters out the first level and second level contacts whose personality traits do not match the personality traits of the user to a degree that exceeds a predetermined threshold amount. For example, PAS 106 determines that the user who is requesting career coaching has a high level of openness as a personality trait, determines that contacts B, C, and D have a low level of openness as a personality trait, and filters out contacts B, C, and D so that contacts B, C, and D are not considered as possible career coaches for the user.

SAS 108 performs a cognitive assessment of trade-offs between the identified knowledge sources to determine how to select among conflicting knowledge sources. In one embodiment, SAS 108 uses a mathematical filtering technique called Pareto optimization to enable the user to explore the trade-offs in a consideration of multiple criteria for a single decision. For example, SAS 108 uses Pareto optimization to decide what is the best e-learning and in-class learning alternatives for the particular knowledge domain and sub-domain of the user according to the learning style, areas of interest, and other preferences of the user.

SAS 108 uses Pareto optimization to determine the topmost (e.g., top three) knowledge sources per category and highlights the trade-offs among the knowledge sources. For example, SAS 108 determines courses X, Y, and Z as the top three MOOC courses for the user to complete to advance the user's career, where courses X, Y, and Z are in the e-learning category of knowledge sources.

Cognitive assessment based recommendation system 104 determines learning style(s) 114 of the user. For example, cognitive assessment based recommendation system 104 uses the output of PAS 106 and learning style models, such as the Grasha-Reichmann Learning Style Scale or the Myers-Briggs Indicator to determine learning style(s) of the user.

Cognitive assessment based recommendation system 104 identifies experts 116 by scanning through a ranked list of first level contacts and second level contacts of the user and other contacts in a professional network of the user to find contacts who are experts in the knowledge domain and sub-domain of the user, with whom the user has the most communications compared to other contacts, and which match the user's personality traits, needs, and values to a degree that exceeds a predetermined threshold amount. As used herein, an expert is defined as a person who is in a professional network of a user, and who has expertise in a knowledge domain and knowledge sub-domain of the user. As one example, the experts 116 are possible career coaches who can advise the user to advance the user's career.

Cognitive assessment based recommendation system 104 determines opportunities for future interactions between the user and the experts 116, where the opportunities include events which will be attended by the experts. Cognitive assessment based recommendation system 104 generates suggestions to advance the career of the user, where the suggestions are categorized as quick goals (i.e., short-term goals) or strategic goals (i.e., long-term goals). In one embodiment, the suggestions include a suggestion to interact with the experts 116 to request that at least one of the experts 116 become a career coach for the user to advance the career of the user. For example, a suggestion includes attending Event ABC because Expert E is attending the event and the user can ask Expert E at the Event ABC to be the user's career coach.

In one embodiment, the quick goals are accomplished within a first time period and the strategic goals are accomplished within a second time period, where the first time period begins and ends within a threshold amount of time after a current time, and where the second time period begins and ends after the threshold amount of time after the current time. The quick goals include (1) books, articles, and papers recommended to be read by the user, (2) one or more of the identified experts 116 with whom the user is recommended to interact, and (3) training and educational course(s) recommended to be completed by the user within the first time period to learn about topics related to the knowledge domain and sub-domain of the user. The strategic goals include (1) educational course(s) recommended to be completed by the user within the second time period to learn about trends associated with the knowledge domain, and (2) an attendance at an event that an expert included in the experts 116 is planning to attend and a request to the expert at the event that the expert be a career coach for the user.

In one embodiment, the cognitive assessment based recommendation system 104 selects the quick and strategic goals according to weights assigned to categories of the knowledge sources associated with the quick and strategic goals.

The functionality of the components shown in FIG. 1 is described in more detail in the discussion of FIGS. 2A-2B, FIG. 3, and FIG. 4 presented below.

Process for Cognitive Assessment Based Recommendations

Figure 2A:
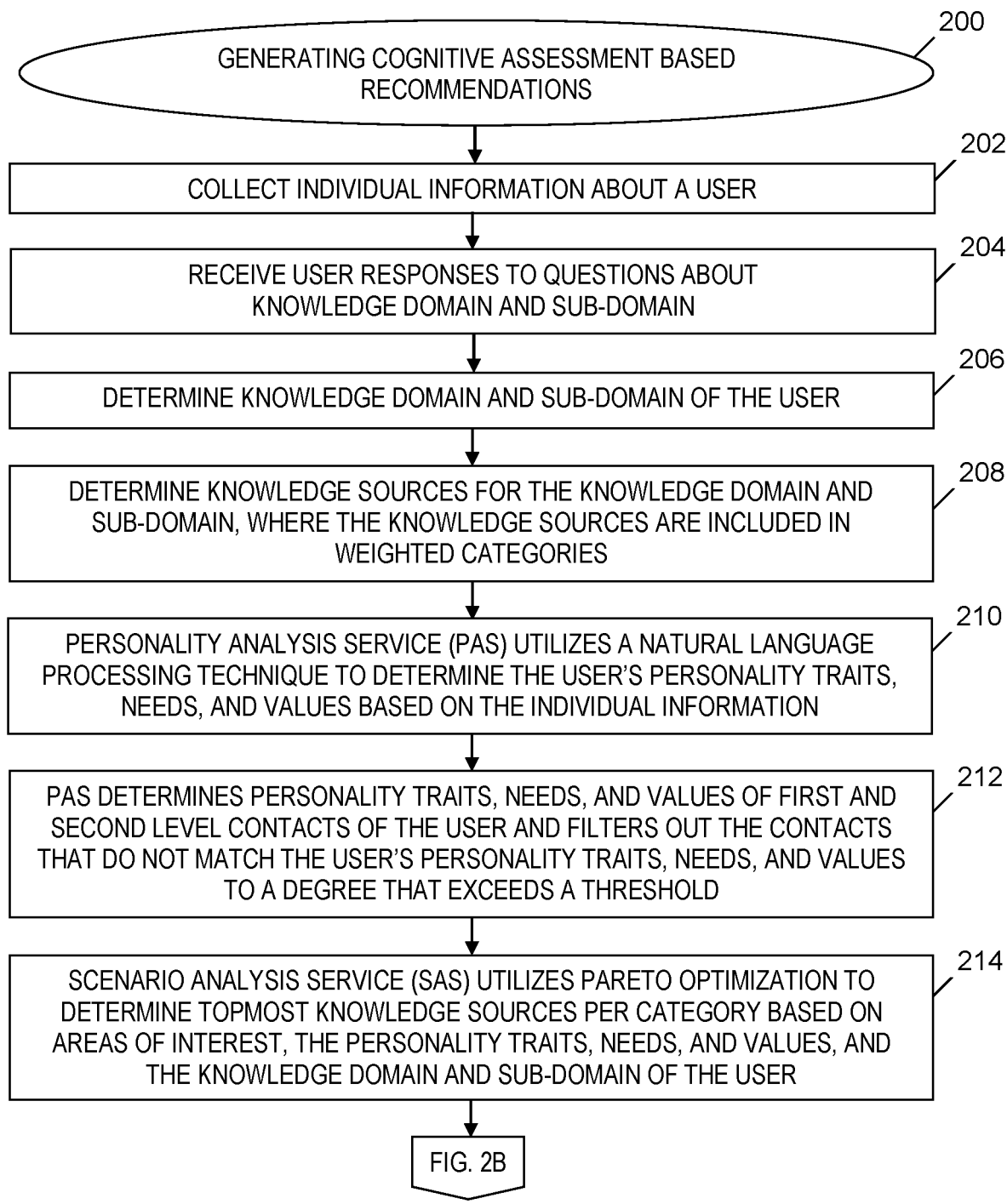
FIGS. 2A-2B depict a flowchart of a process of generating cognitive assessment based recommendations, where the process is implemented in the system of FIG. 1, in accordance with embodiments of the present invention.
Figure 2B:
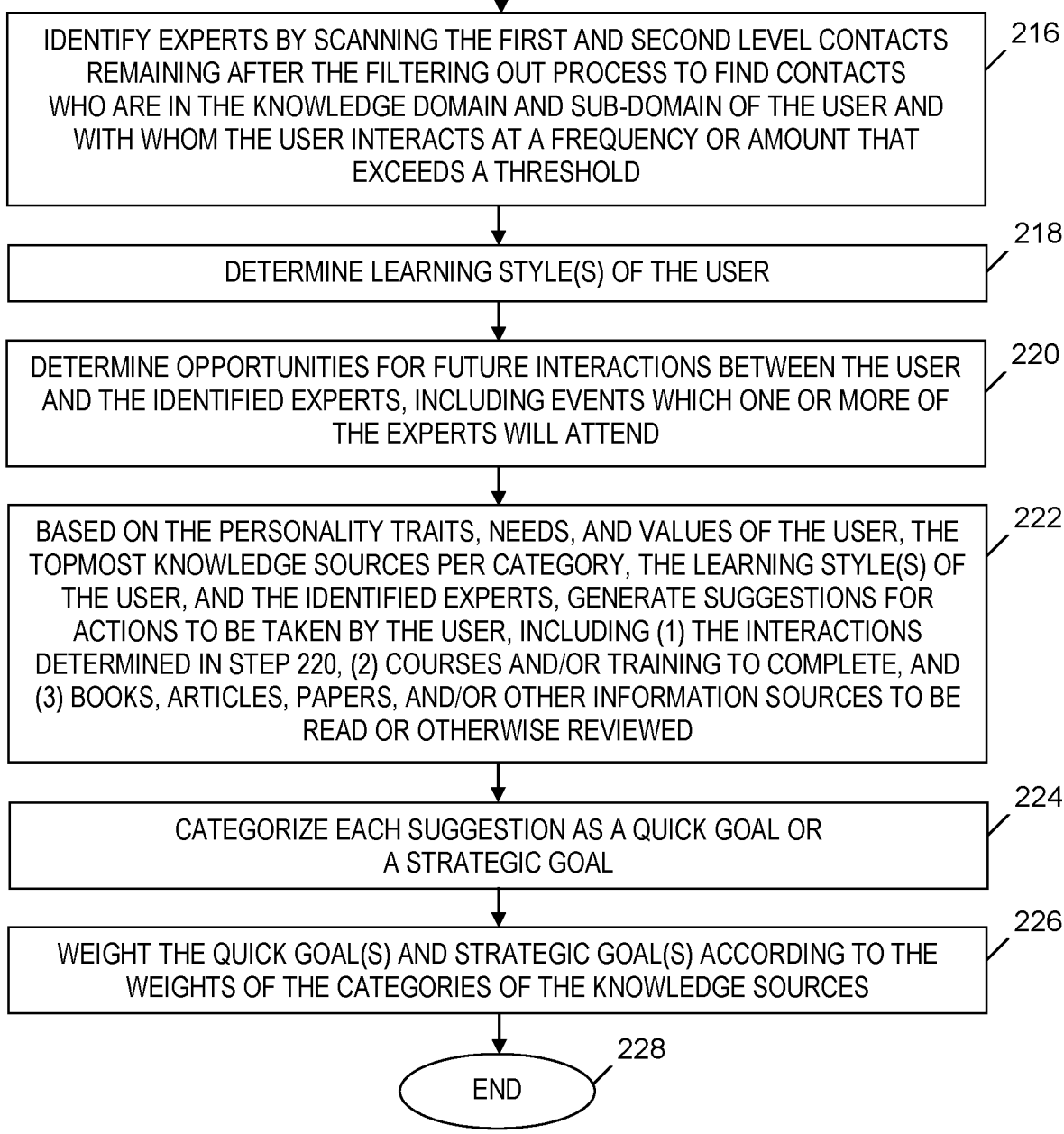

FIGS. 2A-2B depict a flowchart of a process of generating cognitive assessment based recommendations, where the process is implemented in the system of FIG. 1, in accordance with embodiments of the present invention. The process of FIGS. 2A-2B starts at step 200 in FIG. 2A. In step 202, cognitive assessment based recommendation system 104 (see FIG. 1) collects individual information 110 (see FIG. 1) about a user who is requesting a cognitive assessment based recommendation (e.g., career coaching). Individual information 110 (see FIG. 1) includes documents authored by the user, the educational courses completed by the user, blog posts authored by the user, other writings authored by the user, e-mails composed and sent by the user, social network profile data of the user, group affiliations of the user, and communities and professional networks to which the user belongs.

In step 204, cognitive assessment based recommendation system 104 (see FIG. 1) receives user responses 112 (see FIG. 1) to questions that are designed to determine the knowledge domain and knowledge sub-domain of the user.

In step 206, cognitive assessment based recommendation system 104 (see FIG. 1) determines the knowledge domain and knowledge sub-domain of the user based on the user responses 112 (see FIG. 1) received in step 204.

In step 208, cognitive assessment based recommendation system 104 (see FIG. 1) determines knowledge sources for the knowledge domain and sub-domain determined in step 206, where the knowledge sources supply knowledge in the knowledge domain and sub-domain. The knowledge sources are included in categories to which predetermined weights are assigned.

In step 210, PAS 106 (see FIG. 1) in the cognitive assessment based recommendation system 104 (see FIG. 1) utilizes a natural language processing technique to analyze the text in individual information 110 to determine personality traits, needs, and values of the user.

In step 212, PAS 106 (see FIG. 1) determines personality traits, needs, and values of first level contacts and second level contacts of the user in one or more professional networking services. In step 212, cognitive assessment based recommendation system 104 (see FIG. 1) filters out the contacts whose personality traits, needs, and values do not match the personality traits, needs, and values of the user to a degree that exceeds a predetermined threshold amount.

In step 214, SAS 108 (see FIG. 1) in cognitive assessment based recommendation system 104 (see FIG. 1) ranks the knowledge sources determined in step 208 based on matching the knowledge sources to areas of interest of the user and to the personality traits, needs, and values of the user determined in step 210. In one embodiment, step 214 includes cognitive assessment based recommendation system 104 (see FIG. 1) utilizing a Pareto optimization technique to determine topmost knowledge sources per category based on areas of interest of the user, the personality traits, needs, and values of the user, and the knowledge domain and sub-domain of the user, where the topmost knowledge sources per category is a basis for step of ranking the knowledge sources. In one embodiment, the ranking of the knowledge sources in step 214 is further based on preferences of the user and a learning style of the user.

After step 214, the process of FIGS. 2A-2B continues with step 216 in FIG. 2B. In step 216, cognitive assessment based recommendation system 104 (see FIG. 1) identifies experts by scanning the first level contacts and second level contacts of the user that are remaining after the filtering out process in step 212 (see FIG. 2A) to identify experts who are in the knowledge domain and sub-domain of the user and with whom the user interacts at a frequency that exceeds a predetermined threshold frequency or at an amount that exceeds a predetermined threshold amount. In one embodiment, the scanning in step 216 includes scanning other people in the professional network of the user (i.e., other than the first level and second level contacts) to identify other experts who are in the knowledge domain and sub-domain of the user.

In one embodiment, step 216 includes cognitive assessment based recommendation system 104 (see FIG. 1) ranking a list of the first level contacts and the second level contacts of the user based on (i) an amount of communication (i.e., how many communications) between the user and respective first level and second level contacts and (ii) a measure of a degree of matching between the personality traits, needs, and values of the user and personality traits, needs, and values of the first level contacts and the second level contacts. The step of identifying the experts is based on the ranked list of the first level contacts and the second level contacts.

In step 218, cognitive assessment based recommendation system 104 (see FIG. 1) determines learning style(s) 114 (see FIG. 1) of the user (e.g., by using the Grasha-Reichmann Student Learning Styles Scales).

In step 220, cognitive assessment based recommendation system 104 (see FIG. 1) determines opportunities for future interactions between the user and experts identified in step 216. The opportunities include events which one or more of the experts will attend.

In step 222, based on the personality traits, needs, and values of the user determined in step 210 (see FIG. 2A), the topmost knowledge sources per category determined in step 214 (see FIG. 2A), the learning style(s) of the user determined in step 218, and the experts identified in step 216, cognitive assessment based recommendation system 104 (see FIG. 1) generates ranked suggestions for actions to be taken by the user (e.g., actions to advance the career of the user). In one or more embodiments, the suggestions include (1) the user completing the interactions whose opportunities were determined in step 220 together with the user requesting during the interactions that each of the experts involved in the interactions be a career coach of the user, (2) the user completing courses and/or training to advance the career of the user, and/or (3) the user reading or otherwise reviewing books, articles, papers, and/or other sources of information to advance the career of the user.

In one embodiment, cognitive assessment based recommendation system 104 (see FIG. 1) selects the experts in the aforementioned suggestions so that the selected experts are included in the experts 116 (see FIG. 1) identified in step 216, the personality traits, needs, and values of the user match the personality traits, needs, and values of each of the selected experts, and each of the experts have experience and/or abilities that accommodate the learning style(s) of the user.

In one embodiment, cognitive assessment based recommendation system 104 (see FIG. 1) selects the courses and/or training in the suggestions generated in step 222 so that the selected courses and/or training are included in the topmost knowledge sources determined in step 214 (see FIG. 2A) and accommodate the learning style(s) of the user determined in step 218.

In one embodiment, cognitive assessment based recommendation system 104 (see FIG. 1) selects the books, articles, papers, and/or other sources of information in the suggestions generated in step 222 so that the selected books, articles, papers, and/or other sources of information are included in the topmost knowledge sources determined in step 214 (see FIG. 2A) and accommodate the learning style(s) of the user determined in step 218.

In one embodiment, prior to step 222, cognitive assessment based recommendation system 104 (see FIG. 1) assigns weights to the categories that include the knowledge sources and generating and ranking the aforementioned suggestions is based on the ranked knowledge sources and the weights assigned to the categories.

In step 224, cognitive assessment based recommendation system 104 (see FIG. 1) categorizes each of the suggestions generated in step 222 as a quick goal or a strategic goal.

In step 226, cognitive assessment based recommendation system 104 (see FIG. 1) weights the quick goal(s) and strategic goal(s) according to the weights of the categories of the knowledge sources associated with the quick and strategic goals.

After step 226, the process of FIGS. 2A-2B ends at step 228.

Example

FIG. 3 is an example of a table 300 that assigns weights to knowledge source categories in the process of FIGS. 2A-2B, in accordance with embodiments of the present invention. Table 300 assigns weights as integers in the ordered range of one to five, inclusively, where five indicates the most important and most relevant goal. Table 300 assigns 2 as the weight of a quick goal associated with a knowledge source that is included in the Research trends and articles category and assigns 5 as the weight of a strategic goal associated with a knowledge source that is included in the Research trends and articles category.

Similarly, for the Technology trends category, table 300 assigns a weight of 3 to quick goals and a weight of 5 to strategic goals. For the e-Learning category, table 300 assigns a weight of 5 to quick goals and a weight of 3 to strategic goals. For the In-class learning category, table 300 assigns a weight of 3 to quick goals and a weight of 5 to strategic goals. For the Areas of interest of the user category, table 300 assigns a weight of 2 to quick goals and a weight of 5 to strategic goals.

For example, the weighting of quick goal(s) and strategic goal(s) in step 226 (see FIG. 2B) uses the weights assigned by table 300.

Computer System

Figure 4:
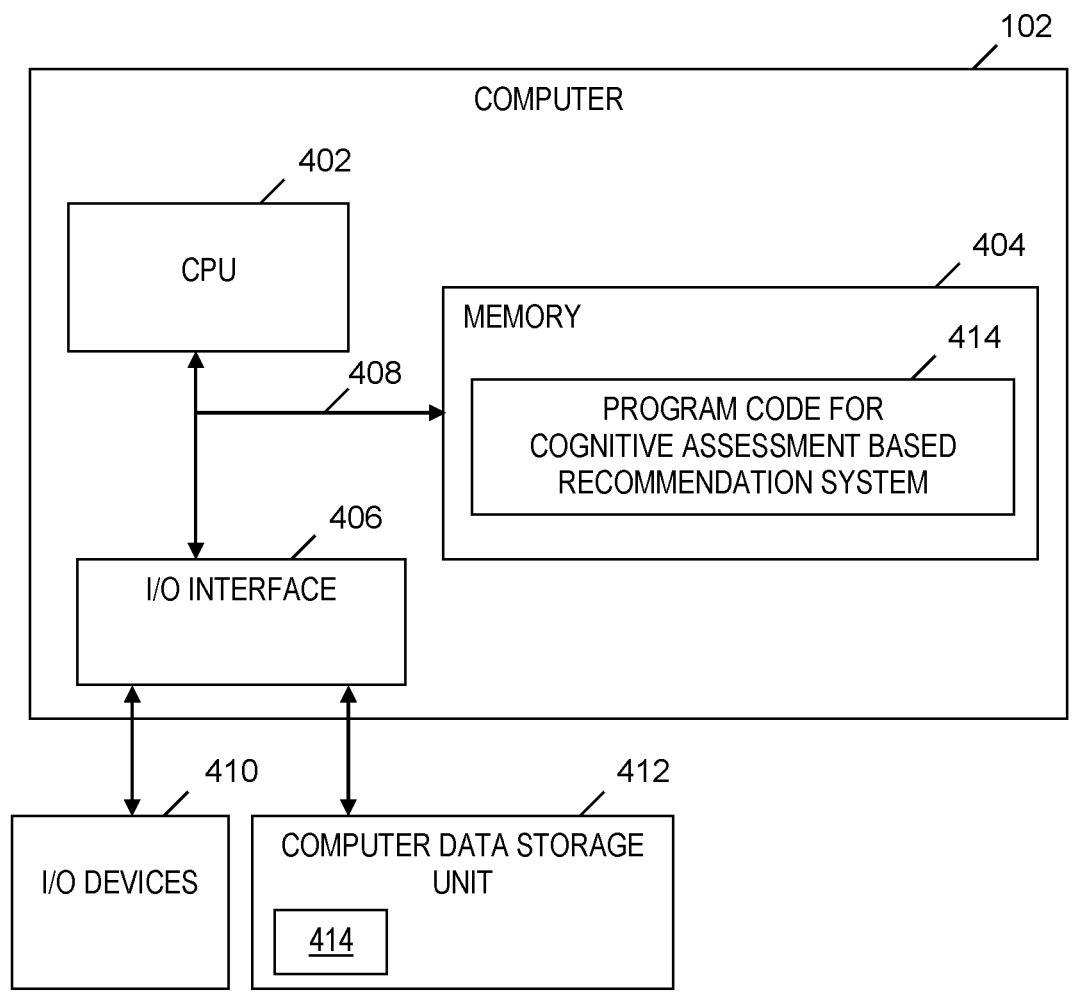
FIG. 4 is a block diagram of a computer included in the system of FIG. 1 and that implements the process of FIGS. 2A-2B in accordance with embodiments of the present invention.

FIG. 4 is a block diagram of a computer 102 included in the system of FIG. 1 and that implements the process of FIGS. 2A-2B in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 for cognitive assessment based recommendation system 104 (see FIG. 1) to perform a method of generating cognitive assessment based recommendations, where the instructions are executed by CPU 402 via memory 404. CPU 402 may include a single processing unit or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes a known computer readable storage medium, which is described below. In one embodiment, computer data storage unit 412 is a non-volatile data storage device, such as a magnetic disk drive (i.e., hard disk drive) or an optical disc drive (e.g., a CD-ROM drive which receives a CD-ROM disk).

Memory 404 and/or storage unit 412 may store computer program code 414 that includes instructions that are executed by CPU 402 via memory 404 to generate cognitive assessment based recommendations. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to generating cognitive assessment based recommendations. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to generate cognitive assessment based recommendations. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of generating cognitive assessment based recommendations.

While it is understood that program code 414 for generating cognitive assessment based recommendations may be deployed by manually loading directly in client, server and proxy computers (not shown) via loading a computer readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider can offer to create, maintain, support, etc. a process of generating cognitive assessment based recommendations. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, switches, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIGS. 2A-2B) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method comprising the steps of:
   collecting, by one or more processors, individual information associated with a user, the individual information including writings authored by the user;
   determining, by the one or more processors, a knowledge domain of the user and a knowledge sub-domain of the user which is associated with the knowledge domain;
   determining, by the one or more processors, knowledge sources that supply knowledge in the knowledge domain and the knowledge sub-domain;
   based on an analysis of the individual information by a personality analysis service using natural language processing, determining, by the one or more processors, personality traits, needs, and values of the user;
   based on an analysis of the knowledge sources and the personality traits, needs, and values of the user by a scenario analysis service, ranking, by the one or more processors, the knowledge sources;
   identifying, by the one or more processors, experts in the knowledge domain and sub-domain of the user by scanning a ranked list of first level contacts and second level contacts of the user in one or more professional networking services; and
   based on the personality traits, needs, and values of the user, the ranked knowledge sources, and the identified experts, generating, by the one or more processors, ranked suggestions for an advancement of a career of the user, the suggestions including one or more quick goals and one or more strategic goals.

2. The method of claim 1, further comprising the step of generating, by the one or more processors, the one or more quick goals for the advancement of the career of the user and the one or more strategic goals for the advancement of the career of the user, wherein the one or more quick goals are accomplished within a first time period and include books, articles, and papers recommended to be read by the user, one or more of the identified experts with whom the user is recommended to interact, and training and one or more educational courses recommended to be completed by the user to learn about topics related to the knowledge domain and sub-domain, and wherein the one or more strategic goals are accomplished within a second time period and include one or more educational courses recommended to be completed by the user to learn about trends associated with the knowledge domain, and an attendance at an event that an expert included in the experts is planning to attend together with a request to the expert at the event that the expert be a career coach for the user, wherein the event occurs within the second predetermined time period, wherein the first time period begins and ends within a threshold amount of time after a current time, and wherein the second time period begins and ends after the threshold amount of time after the current time.

3. The method of claim 1, further comprising the steps of:
   assigning, by the one or more processors, weights to categories that include the knowledge sources; and
   based on the ranked knowledge sources and the weights assigned to the categories, generating, by the one or more processors, a suggestion for the advancement of the career of the user which includes an interaction between the user and an expert included in the identified experts and a request that the expert be a career coach for the user.

4. The method of claim 1, further comprising the step of ranking, by the one or more processors, a list of the first level contacts and the second level contacts of the user based on (i) numbers of communications between the user and respective first level and second level contacts and (ii) a measure of a degree of matching between the personality traits, needs, and values of the user and personality traits, needs, and values of the first level contacts and the second level contacts, wherein the step of identifying the experts is based on the ranked list of the first level contacts and the second level contacts.

5. The method of claim 1, further comprising the step of identifying, by the one or more processors, a topmost number of knowledge sources per category included in a set of categories of the knowledge sources, wherein the step of ranking the knowledge sources is based on the identified topmost number of knowledge sources per category.

6. The method of claim 5, wherein the step of ranking the knowledge sources is further based on preferences of the user and a learning style of the user and utilizes Pareto optimization to determine optimal knowledge sources within each of the categories.

7. The method of claim 1, wherein the step of collecting the individual information includes collecting information about documents, e-mails, and blog postings authored by the user, educational courses completed by the user, group affiliations of the user, social network profile data about the user, and communities and professional networks with which the user is associated.

8. The method of claim 1, further comprising the step of:
   providing at least one support service for at least one of creating, integrating, hosting, maintaining, and deploying computer readable program code in the computer, the program code being executed by a processor of the computer to implement the steps of collecting the individual information, determining the knowledge domain and the knowledge sub-domain, determining the knowledge sources, determining the personality traits, needs, and values, ranking the knowledge sources, identifying the experts, and generating the ranked suggestions.

9. A computer program product comprising:
   a computer readable storage medium having computer readable program code stored on the computer readable storage medium, the computer readable program code being executed by a central processing unit (CPU) of a computer system to cause the computer system to perform a method comprising the steps of:
   the computer system collecting individual information associated with a user, the individual information including writings authored by the user;
   the computer system determining a knowledge domain of the user and a knowledge sub-domain of the user which is associated with the knowledge domain;
   the computer system determining knowledge sources that supply knowledge in the knowledge domain and the knowledge sub-domain;
   based on an analysis of the individual information by a personality analysis service using natural language processing, the computer system determining personality traits, needs, and values of the user;
   based on an analysis of the knowledge sources and the personality traits, needs, and values of the user by a scenario analysis service, the computer system ranking the knowledge sources;
   the computer system identifying experts in the knowledge domain and sub-domain of the user by scanning a ranked list of first level contacts and second level contacts of the user in one or more professional networking services; and based on the personality traits, needs, and values of the user, the ranked knowledge sources, and the identified experts, the computer system generating ranked suggestions for an advancement of a career of the user, the suggestions including one or more quick goals and one or more strategic goals.

10. The computer program product of claim 9, wherein the method further comprises the step of the computer system generating the one or more quick goals for the advancement of the career of the user and the one or more strategic goals for the advancement of the career of the user, wherein the one or more quick goals are accomplished within a first time period and include books, articles, and papers recommended to be read by the user, one or more of the identified experts with whom the user is recommended to interact, and training and one or more educational courses recommended to be completed by the user to learn about topics related to the knowledge domain and sub-domain, and wherein the one or more strategic goals are accomplished within a second time period and include one or more educational courses recommended to be completed by the user to learn about trends associated with the knowledge domain, and an attendance at an event that an expert included in the experts is planning to attend together with a request to the expert at the event that the expert be a career coach for the user, wherein the event occurs within the second predetermined time period, wherein the first time period begins and ends within a threshold amount of time after a current time, and wherein the second time period begins and ends after the threshold amount of time after the current time.

11. The computer program product of claim 9, wherein the method further comprises the steps of:
the computer system assigning weights to categories that include the knowledge sources; and
based on the ranked knowledge sources and the weights assigned to the categories, the computer system generating a suggestion for the advancement of the career of the user which includes an interaction between the user and an expert included in the identified experts and a request that the expert be a career coach for the user.

12. The computer program product of claim 9, wherein the method further comprises the step of the computer system ranking a list of the first level contacts and the second level contacts of the user based on (i) numbers of communications between the user and respective first level and second level contacts and (ii) a measure of a degree of matching between the personality traits, needs, and values of the user and personality traits, needs, and values of the first level contacts and the second level contacts, wherein the step of identifying the experts is based on the ranked list of the first level contacts and the second level contacts.

13. The computer program product of claim 9, wherein the method further comprises the step of the computer system identifying a topmost number of knowledge sources per category included in a set of categories of the knowledge sources, wherein the step of ranking the knowledge sources is based on the identified topmost number of knowledge sources per category.

14. The computer program product of claim 13, wherein the step of ranking the knowledge sources is further based on preferences of the user and a learning style of the user and utilizes Pareto optimization to determine optimal knowledge sources within each of the categories.

15. A computer system comprising:
a central processing unit (CPU);
a memory coupled to the CPU; and
a computer readable storage medium coupled to the CPU, the computer readable storage medium containing instructions that are executed by the CPU via the memory to implement a method comprising the steps of:
the computer system collecting individual information associated with a user, the individual information including writings authored by the user;
the computer system determining a knowledge domain of the user and a knowledge sub-domain of the user which is associated with the knowledge domain;
the computer system determining knowledge sources that supply knowledge in the knowledge domain and the knowledge sub-domain;
based on an analysis of the individual information by a personality analysis service using natural language processing, the computer system determining personality traits, needs, and values of the user;
based on an analysis of the knowledge sources and the personality traits, needs, and values of the user by a scenario analysis service, the computer system ranking the knowledge sources;
the computer system identifying experts in the knowledge domain and sub-domain of the user by scanning a ranked list of first level contacts and second level contacts of the user in one or more professional networking services; and
based on the personality traits, needs, and values of the user, the ranked knowledge sources, and the identified experts, the computer system generating ranked suggestions for an advancement of a career of the user, the suggestions including one or more quick goals and one or more strategic goals.

16. The computer system of claim 15, wherein the method further comprises the step of the computer system generating the one or more quick goals for the advancement of the career of the user and the one or more strategic goals for the advancement of the career of the user, wherein the one or more quick goals are accomplished within a first time period and include books, articles, and papers recommended to be read by the user, one or more of the identified experts with whom the user is recommended to interact, and training and one or more educational courses recommended to be completed by the user to learn about topics related to the knowledge domain and sub-domain, and wherein the one or more strategic goals are accomplished within a second time period and include one or more educational courses recommended to be completed by the user to learn about trends associated with the knowledge domain, and an attendance at an event that an expert included in the experts is planning to attend together with a request to the expert at the event that the expert be a career coach for the user, wherein the event occurs within the second predetermined time period, wherein the first time period begins and ends within a threshold amount of time after a current time, and wherein the second time period begins and ends after the threshold amount of time after the current time.

17. The computer system of claim 15, wherein the method further comprises the steps of:
the computer system assigning weights to categories that include the knowledge sources; and
based on the ranked knowledge sources and the weights assigned to the categories, the computer system generating a suggestion for the advancement of the career of the user which includes an interaction between the user and an expert included in the identified experts and a request that the expert be a career coach for the user.

18. The computer system of claim 15, wherein the method further comprises the step of the computer system ranking a list of the first level contacts and the second level contacts of the user based on (i) numbers of communications between the user and respective first level and second level contacts and (ii) a measure of a degree of matching between the personality traits, needs, and values of the user and personality traits, needs, and values of the first level contacts and the second level contacts, wherein the step of identifying the experts is based on the ranked list of the first level contacts and the second level contacts.

19. The computer system of claim 15, wherein the method further comprises the step of the computer system identifying a topmost number of knowledge sources per category included in a set of categories of the knowledge sources, wherein the step of ranking the knowledge sources is based on the identified topmost number of knowledge sources per category.

20. The computer system of claim 19, wherein the step of ranking the knowledge sources is further based on preferences of the user and a learning style of the user and utilizes Pareto optimization to determine optimal knowledge sources within each of the categories.

* * * * *